United States Patent [19]

Lingg

[11] Patent Number: 4,558,633
[45] Date of Patent: Dec. 17, 1985

[54] WEATHERSHIELD FOR AUTOMOBILES

[75] Inventor: George Lingg, Glendale, N.Y.

[73] Assignee: Aussie Auto Accessory Imports, Ltd., Glendale, N.Y.

[21] Appl. No.: 637,616

[22] Filed: Aug. 3, 1984

[51] Int. Cl.$^4$ .............................................. G03C 7/00
[52] U.S. Cl. ................................. 98/2.13; 296/84 C; 296/152
[58] Field of Search ................ 98/2, 2.12, 2.13; 296/152, 84 C, 84 M

[56] References Cited

U.S. PATENT DOCUMENTS

| | | | |
|---|---|---|---|
| 2,242,931 | 5/1941 | Traver | 296/84 C |
| 2,468,439 | 4/1949 | Gregorius | 98/2.13 |
| 2,575,660 | 11/1951 | Geidl | 296/152 |
| 2,583,759 | 1/1952 | Williams et al. | 98/2.13 |
| 2,696,154 | 12/1954 | Eaton | 296/84 C |
| 2,816,795 | 12/1957 | Galloway | 296/84 C |
| 2,841,440 | 7/1958 | Werner | 296/152 |
| 3,726,207 | 4/1973 | Young | 98/2.13 |
| 3,757,663 | 9/1973 | McCarroll | 98/2.12 |
| 3,785,699 | 1/1974 | Molaskey | 296/152 |
| 4,191,097 | 3/1980 | Groen | 98/2.12 |

Primary Examiner—Ronald C. Capossela
Attorney, Agent, or Firm—Steinberg & Raskin

[57] ABSTRACT

A weathershield for automobiles for deflecting the air flow relative to a moving automobile as well as rain and the like and so that the same will not enter the passenger compartment includes a body portion having a rearwardly extending part which extends to the rear side of the window frame, the rearwardly extending part having a rear end region which is curved to converge towards the rear frame side. The body portion is bounded by edge portions including substantially planar outer edge portions adapted to be coupled to respective frame sides. A rear outer edge portion is adapted to be coupled to the substantially vertical rear frame side to prevent any possibility of the weathershield snagging onto the clothes of a person outside the automobile or catching onto the brushes of an automatic car wash.

5 Claims, 4 Drawing Figures

WEATHERSHIELD FOR AUTOMOBILES

BACKGROUND OF THE INVENTION

This invention relates generally to automobile accessories and, more particularly, to a weathershield for automobiles for deflecting the air flow relative to a moving automobile as well as rain or the like so that the same will not enter the passenger compartment.

Weathershield accessories for automobiles are known. For example, weathershields adapted to be affixed within a window frame of an automobile are known which will deflect the air flow moving relative thereto as well as rain or the like in a manner such that the same will not enter the passenger compartment when the window is down or open. Such windshields are advantageous in that the automobile windows can remain open even when the automobile is traveling at high speeds without incurring the effects of high winds within the passenger compartment, e.g., loose papers or other light articles being blown about. Moreover, the automobile windows can be kept open under rainy conditions without the occupants becoming wet which is advantageous especially in warm weather or where weather conditions are such that the auto windshield would become foggy if the windows were up or closed.

Conventional weathershields generally are constructed of transparent plastic material, such as acrylate resins known as Plexiglas or Lucite. Thus, sheets of such transparent plastic are generally formed, such as by molding, so as to have an aerodynamically shaped convex body portion which protrudes beyond the outer profile of the automobile, the body portion being bounded on its outer edges by edge portions, certain ones of which are adapted to be affixed to the front side and possibly the forward side portions of the frame of the auto window.

Although such conventional weathershields function satisfactorily in that the air flow passing a moving automobile as well as rain or the like are deflected thereby to prevent their entry into the passenger compartment, several disadvantages are inherent in their design. In particular, it has been found that there is a danger of the rear side region of the weathershield snagging onto the clothes of a person in the case where the automobile passes in close proximity or where the automobile doors are opened and closed in close proximity. Another serious problem is encountered when an automobile fitted with such conventional weathershields is moved through an automatic car wash. The rotating brushes of the car wash tend to become caught in a free edge portion of the shield and can bend or break the shield, not to mention the possible damage which may be caused to the car wash apparatus.

SUMMARY OF THE INVENTION

Accordingly, it is an object of the present invention to provide a new and improved automobile weathershield for deflecting air flow relative to the moving automobile as well as rain or the like to prevent the same from entering the passenger compartment.

Another object of the present invention is to provide a new and improved automobile weathershield which overcomes the disadvantages of conventional weathershields as described above.

Still another object of the present invention is to provide a new and improved automobile weathershield which has better aerodynamic properties than conventional weathershields.

A further object of the present invention is to provide a new and improved automobile weathershield which can be affixed to the frame of an automobile window in a more secure manner than has been possible heretofore.

A still futher object of the present invention is to provide a new and improved automobile weathershield which shields the occupants of the automobile from outside air flow and the elements, e.g., rain or the like, more efficiently than has been possible heretofore.

Briefly, in accordance with the present invention, these and other objects are attained by providing a weathershield constructed to some extent in a manner similar to prior art weathershields in that it is formed of a transparent acrylate resin, e.g., Plexiglas, with a thickness of about ⅛" and having an aerodynamically shaped convex body portion which protrudes beyond the outer profile of the automobile. The body portion is bounded by edge portions adapted to be affixed to the sides of the auto window frame. However, in accordance with the present invention, the body portion of the weathershield is formed with a rearwardly extending part which extends over the entire length of the window frame and which terminates at a substantially vertical rear edge portion. The rear end region of the rearwardly extending part is shaped so as to converge with the rear side of the window frame so that the rear edge portion of the weathershield can be affixed thereto.

In this manner any possibility of the weathershield snagging onto the clothes of a person in proximity to whom the automobile passes or catching onto the brushes of an automobile car wash is virtually eliminated. Additionally, a weathershield constructed in accordance with the invention having a rearwardly extending part whose rear edge region converges towards the rearward side of the window frame has better aerodynamic properties and provides better shielding and wind deflection than conventional weathershields. Moreover, the affixation of a weathershield in accordance with the present invention is more secure than in the case of the prior art.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
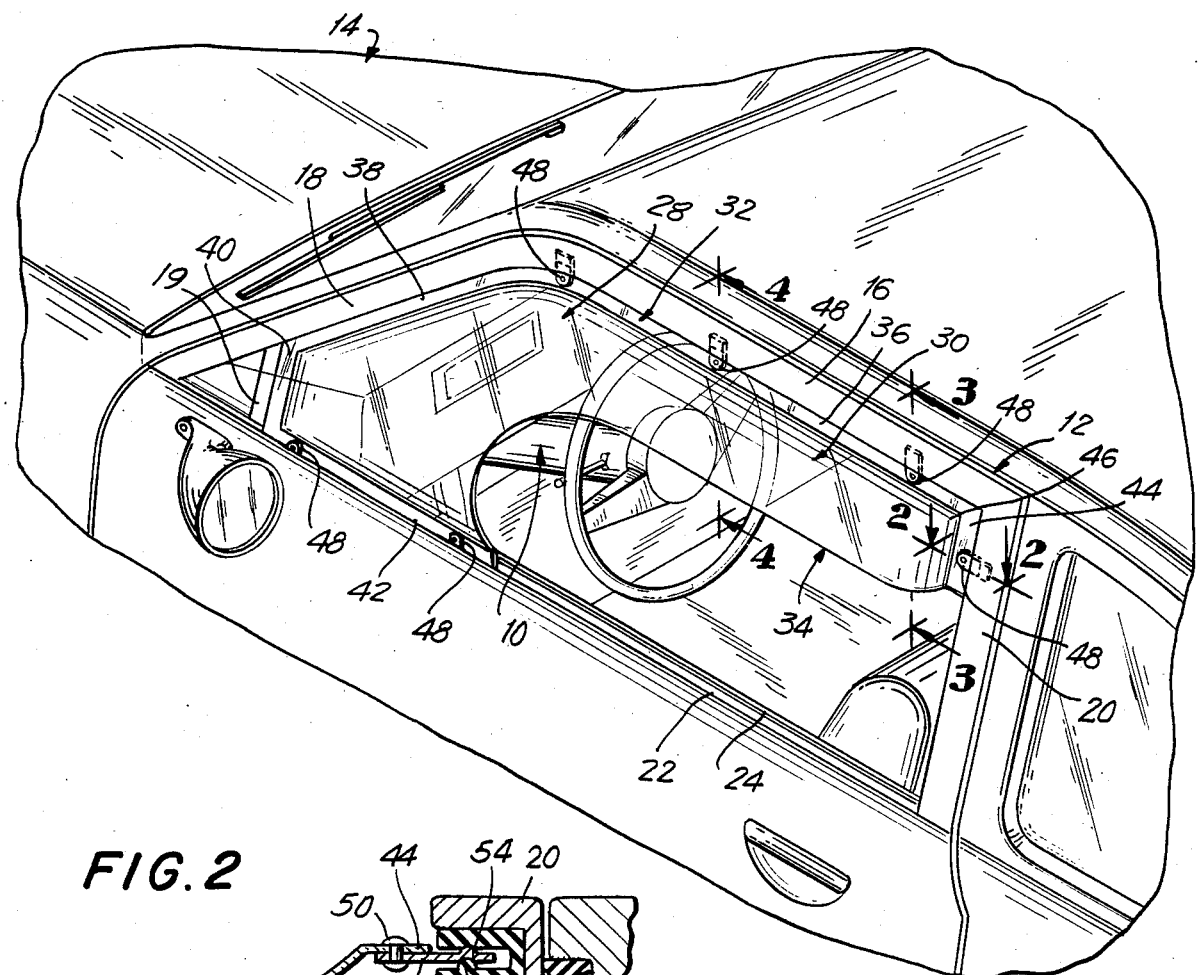
FIG. 1 is a perspective view of a weathershield in accordance with the present invention affixed to the window frame of an automobile.

Referring now to the drawings wherein like reference characters designate identical or corresponding parts throughout the several views and more particularly to FIG. 1, a weathershield 10 in accordance with the invention is illustrated affixed to window frame 12 of an automobile 14. The window frame 12 includes a substantially horizontal top side 16, a downwardly and forwardly extending forward side 18, a substantially vertical front side 19 and a substantially vertical rear side 20. The frame 12 is completed by the trim 22 provided along the window receiving slot region 24 of door 26.

The weathershield 10 is constructed of transparent plastic material such, for example, of ⅛" thick Plexiglas, and includes a body portion 28. Body portion 28 has an aerodynamic, substantially convex shape so that when the weathershield is affixed to the window frame as described below, the body portion protrudes outwardly beyond the outer profile of the automobile. The particular shape of the body portion is adapted to conform to the configuration of the window frame of the particular automobile model with which it is to be associated.

Body portion 28 is formed with a rearwardly extending part 30 which extends over the entire rearward and upper portion of the window opening and is bounded by outer edge regions, generally designated 32, and an inner edge region 34. The weathershield 10 is affixed to the window frame 12 at the outer edge regions 32.

Outer edge regions 32 are substantially planar and include a top outer edge portion 36 adapted to be coupled to the top side 16 of window frame 12, a downwardly and forwardly extending outer edge portion 38 adapted to be coupled to frame side 18, a forward outer edge portion 40 adapted to be coupled to frame side 19, and a bottom outer edge portion 42 adapted to be coupled to the trim 22.

Figure 2:
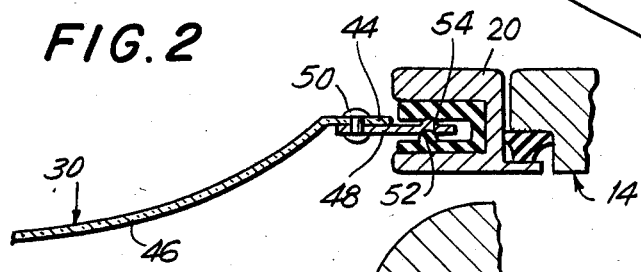
FIG. 2 is a section view taken along line 2—2 of FIG. 1 and illustrating the rear end region and rear edge portion of the weathershield, and one manner by which the rear edge portion is affixed to the rearward side of the window frame.
Figure 3:
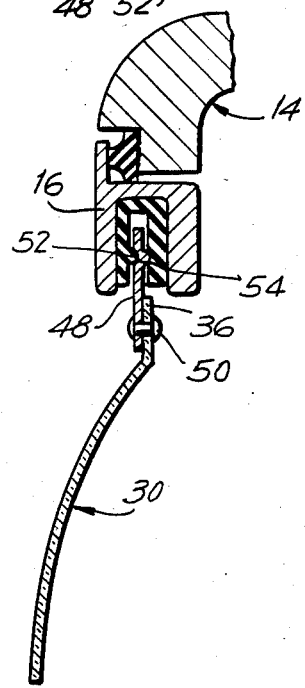
FIG. 3 is a section view taken along line 3—3 of FIG. 1.
Figure 4:
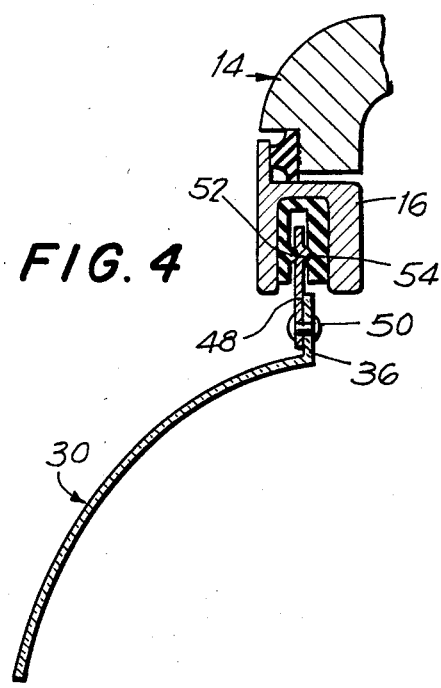
FIG. 4 is a section view taken along line 4—4 of FIG. 1.

According to the invention, the rear end region 46 of the rearwardly extending part 30 of body portion 28 of weather shield 10 terminates at a rear outer edge portion 44 which is adapted to be coupled to the rear side 20 of frame 12. More particularly, referring to FIGS. 1 and 2, the rear end region 46 of rearwardly extending part 30 is shaped so as to converge with the rear side 20 of window frame 12. In other words, the rear end region is shaped to curve rearwardly from a point situated outside of the outer profile of the automobile to a point situated substantially within the plane of the window frame. The planar rear outer edge portion 44 extends outwardly from the end of the rear edge region 46 so that it can be coupled to the rear side 20 of the frame 12.

The weathershield 10 may be affixed to the window frame 12 in any conventional manner. As shown in the illustrated embodiment a plurality of attachment clips 48 specifically adapted for use with the particular automobile model are affixed to the planar outer edge regions, such as by rivets 50. Each clip 48 has a channel 52 formed therein which is adapted to receive a corresponding rib 54 formed along the frame side to which it is to be affixed. It is then only necessary to slip the clips 48 (attached to the weathershield) into the appropriate frame side and urge the same outwardly until the rib 54 snaps into the channel 52.

It is seen from the foregoing that according to the present invention the weathershield 10 is provided with a rearwardly extending part 30 which extends to the rear side 20 of the window frame 12 and that the rearwardly extending part has a rear end region 46 which is curved to converge towards the rear side 20 and terminates at a planar rear outer edge portion 44 adapted to be coupled to the rear frame side 20. In this manner, any possibility of the weathershield snagging onto the clothes of a person in proximity to whom the automobile passes or catching onto the brushes of an automatic car wash is eliminated. Moreover, a weathershield having such construction in accordance with the invention has better aerodynamic properties and provides better shielding and wind deflection than conventional weathershields. The securement of the weathershield to the window frame in accordance with the invention is also more reliable than has been possible heretofore.

Obviously, numerous modifications and variations of the present invention are possible in the light of the above teachings. It is therefore to be understood that the invention may be varied within the scope of the claims appended hereto.

What is claimed is:

1. A weathershield for an automobile for deflecting the air stream flow relative to a moving automobile, said weathershield adapted to be affixed to a window frame of the automobile which includes, relative to the front and rear of the automobile, a top side, a forward side and a substantially vertical rear side, comprising:

a body portion having a length substantially equal to the length of the window frame, said body portion having a substantially convex shape which protrudes outwardly beyond an outer profile of the automobile to which it is adapted to be affixed, said body portion having a rearwardly extending part which extends over the entire rearward and upper portion of the window frame to a position adjacent to said rear side of said window frame;

said body portion being bounded by inner and outer edge regions, said outer edge regions including a rear outer edge region shaped to converge with said substantially vertical rear side of said window frame and terminating substantially within the plane of the window frame;

a substantially planar rear outer edge portion extending outwardly from said rear outer edge region; and means for coupling said rear outer edge portion to said rear side of said frame.

2. The combination of claim 1 wherein said outer edge regions include a top planar edge portion adapted to be coupled to said frame top side and a forward planar edge portion adapted to be coupled to said frame forward side.

3. The combination of claim 2 wherein said outer edge regions further include a bottom edge portion adapted to be coupled to a trim region of said window frame.

4. The combination of claim 1 wherein said coupling means include attachment clip means affixed to said rear edge portion.

5. The combination of claim 4 wherein said clip means include a channel form therein.

* * * * *